United States Patent

[11] 3,564,229

[72] Inventor Gerhard Dirks
Los Altos Hills, Calif.
[21] Appl. No. 796,297
[22] Filed Jan. 23, 1969
[45] Patented Feb. 16, 1971
[73] Assignee Dirks Electronics Corporation
Los Altos Hills, Calif.
[32] Priority Oct. 1, 1948
[33] Germany
[31] P11,464
Continuation of application Ser. No. 357,013, Mar. 30, 1964, abandoned, continuation of application Ser. No. 728,838, Apr. 16, 1958, continuation-in-part of application Ser. No. 432,093, May 25, 1954, continuation-in-part of application Ser. No. 101,032, June 24, 1949, abandoned.

[54] ARRANGEMENT FOR PERFORMING ARITHMETIC OPERATION USING A STATIC AND A DYNAMIC STORAGE
4 Claims, 8 Drawing Figs.

[52] U.S. Cl. .......... 235/176
[51] Int. Cl. .......... G06f 7/50
[50] Field of Search .......... 235/167, 168, 173

[56] References Cited
UNITED STATES PATENTS
2,787,416 4/1957 Hansen .......... 235/61

*Primary Examiner*—Eugene G. Botz
*Assistant Examiner*—David H. Malzahn
*Attorney*—Michael S. Striker

ABSTRACT: A keyboard has keys arranged in denominations and digits within a denomination, each key connecting a digit and denomination selection line, thus storing a digit. A disc has groups of storage locations corresponding to denominations and dynamic storage positions in each group corresponding to the digits, the disc moving relative to reading and writing heads, associated respectively with input and output storage positions on the disc. Each digit selection line is connected to a writing head. A distributor applies signals from the reading heads in a predetermined sequence to the denomination lines in synchronism with the movement of the disc past the read and write head. Signals are thus transferred from the input storage positions on the disc to the output storage positions, the positioning in the output storage positions depending both upon the numbers stored in the input storage positions on the disc and the numbers stored in the keyboard, as well as an arithmetic operation connecting the two numbers.

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

ARRANGEMENT FOR PERFORMING ARITHMETIC OPERATION USING A STATIC AND A DYNAMIC STORAGE

CROSS REFERENCE TO RELATED APPLICATIONS

The present application is a continuation of my application Ser. No. 357,013, filed Mar. 30, 1964, now abandoned which, in turn, is a continuation of may application Ser. No. 728,838, filed Apr. 16, 1958, which, in turn, is a continuation-in-part of my application Ser. No. 423,093, filed May 25, 1954, which, in turn, is a continuation-in-part of my application Ser. No. 101,032, filed June 24, 1949 now abandoned.

This invention relates to electrically operated calculating apparatus.

Various forms of calculating apparatus are known in which the calculating elements which perform addition, subtraction, etc., comprise electromagnetically controlled counting wheels, or counters formed by groups of electromagnetic relays or electronic valves. Such apparatus marked in the parallel mode, that is, all denominations were operated upon simultaneously. Thus, if the largest number to be operated upon had 10 denominations, then each accumulator had 10 counter wheels, or the equivalent in relays or valves. Numbers were usually stored by devices generally similar in construction to the accumulators. Apparatus employing electromagnetically controlled counting wheels is capable of operation only at relatively slow speeds. Higher speeds may be achieved with relay or electronic counters, but a large amount of equipment is required even for a machine of modest capacity.

Accordingly it is an object of the invention to provide electrically operated calculating apparatus which marks in the serial mode, that is, apparatus which operates in sequence upon the denominations of a multidenominational number.

It is a further object of the invention to provide calculating apparatus in which arithmetic operations are performed upon multidenominational numbers by an arithmetic unit which operates on the denominations in sequence, commencing with the least significant denomination.

It is another object of the invention to provide a serially operating number storage device operating in conjunction with a serially operating arithmetic unit.

It is another object of the invention to provide a serial storage device, comprising a cyclically operating magnetic drum or disc, in association with an arithmetic unit.

It is yet another object of the invention to provide serially operating magnetic drum or disc storage device, in association with an arithmetic unit which receives value representing input signals from the storage device and generates value representing signals which are recorded by the storage device.

It is yet another object of the invention to provide a magnetic drum or disc storage device in association with an arithmetic unit which receives value representing signals denomination by denomination from the storage device and generates result representing signals which are entered denomination by denomination into the storage device.

The invention will now be described, by way of example, with reference to the accompanying drawings, in which.

The embodiment of the invention to be described employs a multidenomination keyboard for entry of numbers and a step by step printing mechanism for the recording of visually readable results of calculations. The printing mechanism may consist of individual character bars similar to a conventional typewriter, a single print bar carrying all the numerical characters or a printing device, such as that described in detail in my copending application Ser. No. 432,297 of May 25, 1954, now abandoned, a continuation, Ser. No. 814,814, matured into U.S. Pat. No. 2,976,801 in which the outline of each printed character is built up by a number of impressions.

Storage for numerical values is provided by a magnetic storage disc, the values being represented by signals magnetically recorded on the surface of the disc. The storage device is used in conjunction with an arithmetic unit for the arithmetic processing of values. A value is read denomination by denomination from the storage disc by an associated magnetic transducing head and the value representing signals are applied to the arithmetic unit. The arithmetic unit generates result value signals which are applied to a further magnetic transducing head to effect recording of result value signals, denomination by denomination, on the surface of the storage disc.

Figure 1:
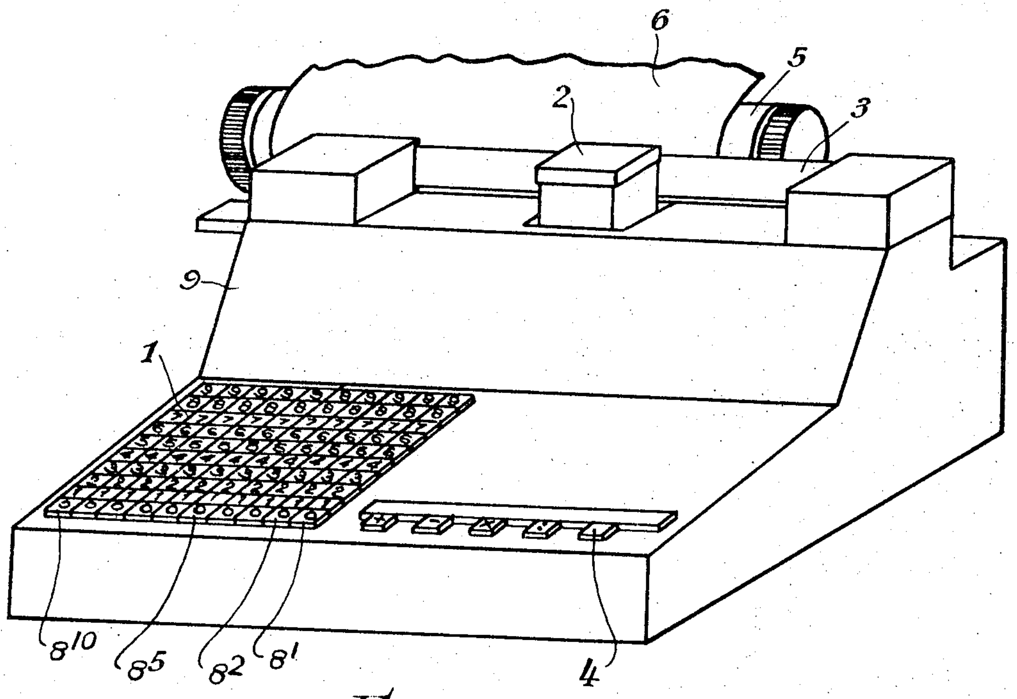
FIG. 1 is a schematic illustration of an electric calculator showing the keyboards and printing mechanism.

FIG. 1 is a schematic illustration of an electric calculator. A platen 5 is mounted in the usual form of typewriter carriage which is supported by the main body 9. A printing mechanism 2 is also mounted on the main body of the machine and by means of an inked ribbon 3 may be used to printed characters on a sheet of paper 6 which passes around the platen 5.

The machine is provided with two sets of keys 4 and 8. The keys 4 are used for controlling the function of the machine such as addition, subtraction and printing. The keys 8 provide a full keyboard for the entry of numerical values. These keys are arranged in 10 columns 8—1 to 8—10, each column containing 10 keys which correspond to the digits 0—9. Thus to enter the value 24, for example, the 4 value key is depressed in the column $8^1$, the 2 value key is depressed in the column $8^2$ and the 0 value key is depressed in each of the remaining columns.

Figure 2:
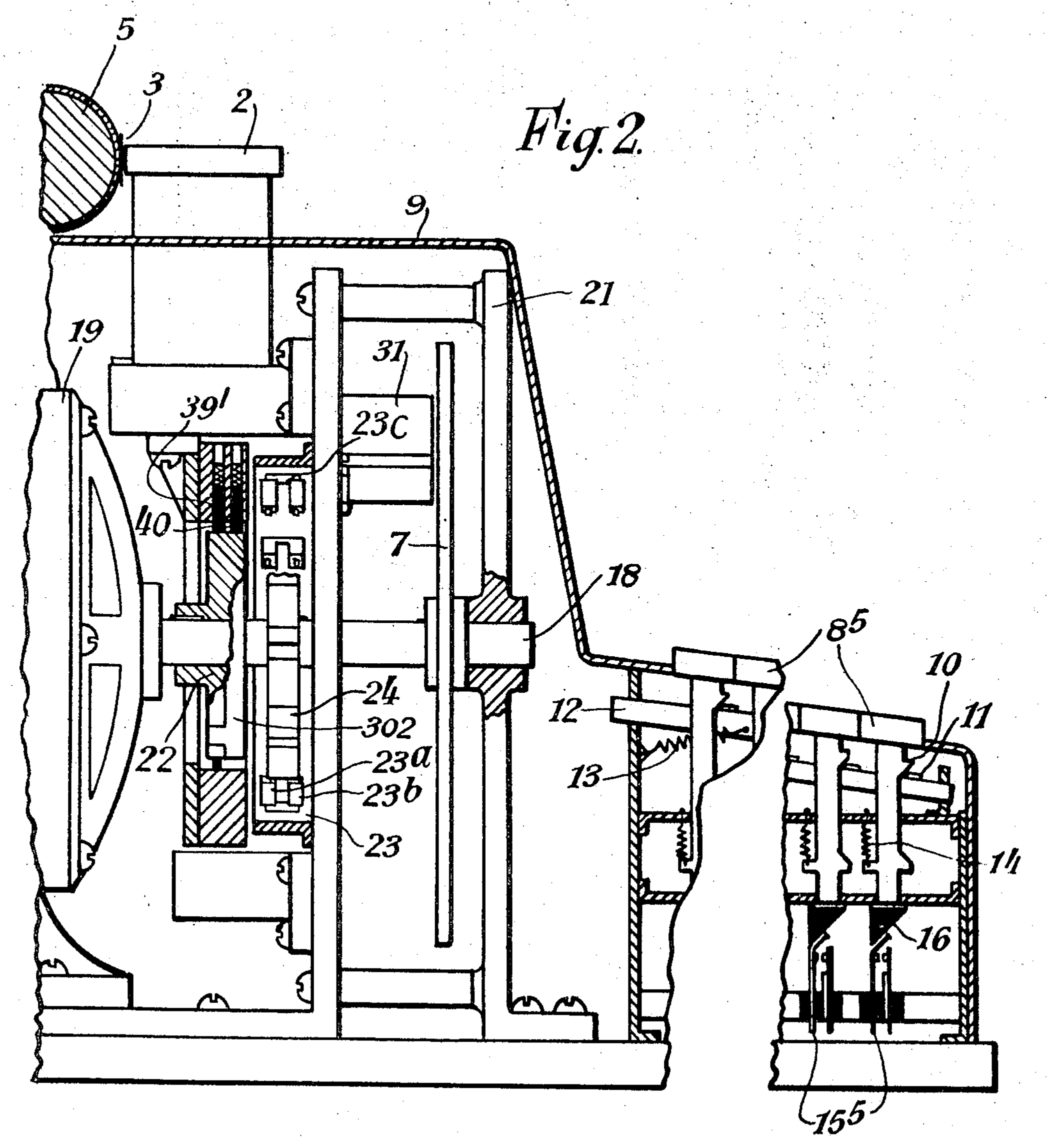
FIG. 2 is a partial sectional view of the calculator of FIG. 1, showing a magnetic disc storage device.

Each key 8 is normally urged upwards by a spring 14 (FIG. 2) which is attached to a projection on the stem of the key. In this position, a further projection 10 lies above a latch 11. All the latches 11 for a column of keys are mounted on a single slide 12 which is urged to the left as seen in FIG. 2 by the spring 13. When one of the keys 8 is fully depressed the projection 10 lies below the related latch 11 so that the key is held in the downward position. During the depression of the key the engagement of the projection 10 with the latch 11 causes the slide 12 to move to the right. If another key in the same column is already in the downward position, the movement of the slide withdraws the latch from the projection 10 of this key which returns to the upper position under the action of the associated spring 14.

The lower end of each key stem carries an insulating member 16 which is positioned above one of a pair of contact members 15. When a key is latched in the downward position, the member 16 engages one of the contact members 15 and forces it into engagement with the other contact member of the pair.

Numerical values are stored in the form of selectively magnetized areas on the magnetizable surface of a disc 7, which is mounted within the body of the machine. The disc 7 is secured to a shaft 18 which is supported in frame members 21. The shaft 18 may be rotated by means of an electric motor 19. A plurality of magnetic head assemblies are secured to one of the frame members 21 in such positions that they cooperate with the magnetizable surface of the disc 7. One such assembly is referenced 31 in FIG. 2 and each assembly may consist of one or more magnetic heads for reading, recording or erasing magnetic signals on the surface of the disc 7.

A rotor 24 is also secured to the shaft 18. This rotor forms part of an inductively operating signal distributor in association with a number of U-shaped magnetic yokes 23*c*, each of which carries a primary coil 23*a* and a secondary coil 23*b*. The yokes 23*c* are attached to a circular frame 23 which is in turn attached to one of the frame members 21.

The shaft 18 carries a second rotor 22 which has a number of conducting segments which cooperate with contact brushes such as $39^1$ and 40.

Figure 3:
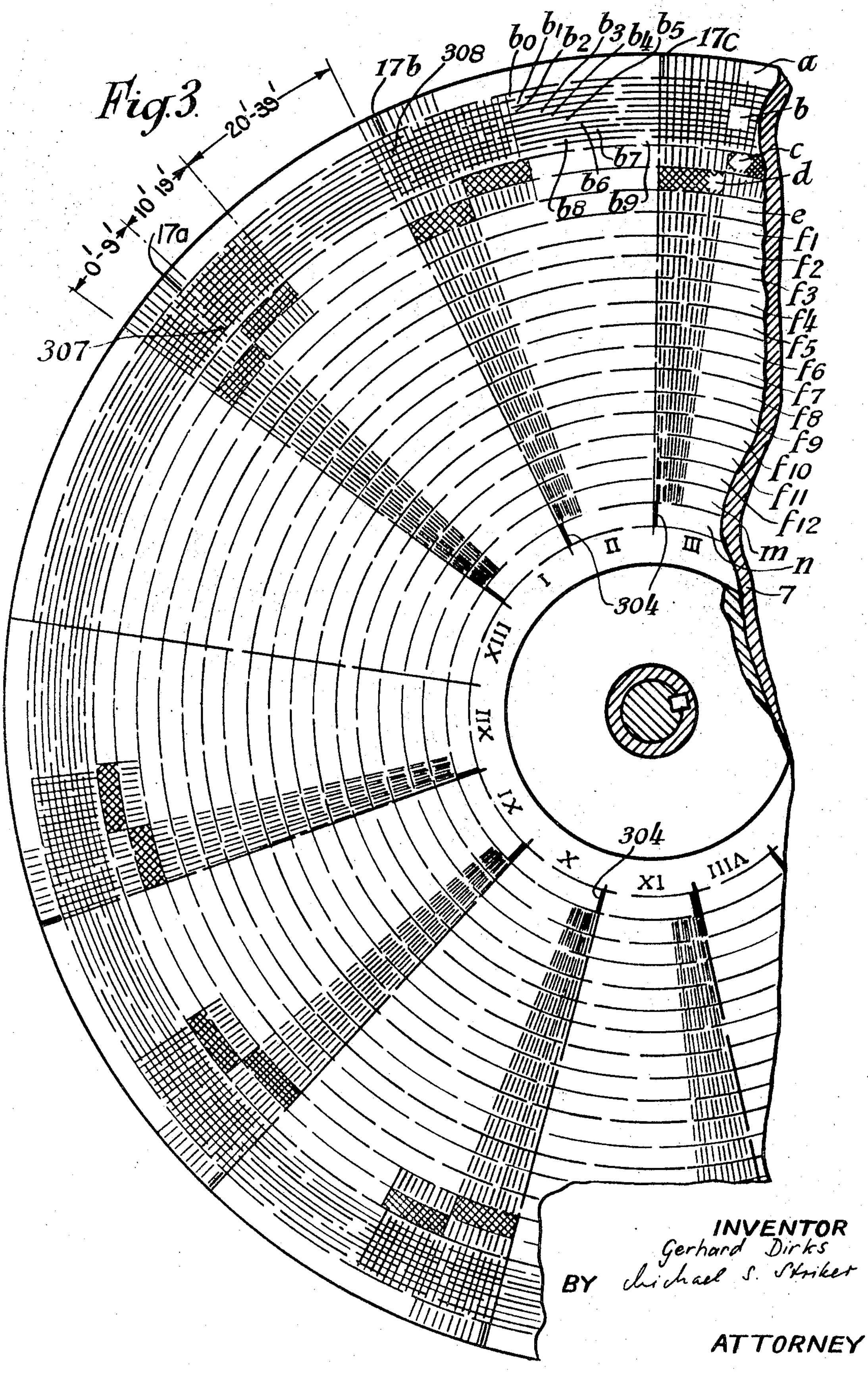
FIG. 3 is a schematic illustration of part of the magnetic storage disc to show the division of the disc into different storage areas.

The magnetizable surface of the disc 7 is to be regarded as being divided into a large number of individual signal storage areas. The surface of the disc provides a number of circular storage tracks *a, b, c, d, e*, $f^1$ to f12, *m* and *n* (FIG. 3). Each track comprises a plurality of storage areas and is used for the recording of signals representing the digits of one numerical value. The surface of the disc is divided radially into 13 sectors I to XIII. Each of the sectors I to XII is associated with one denomination of a recorded numerical value. Thus, the least significant digit of a numerical value is always recorded within the confines of sector I irrespective of the storage track in which it may be recorded. Similarly, the next most significant digit of a value recorded in track *a* is recorded within the sector II section of that track, and the digit of the same significance of a number recorded in track *f*6, for example, is recorded within the sector II section of track *f*6. Sector XIII is not used for storing numerical values and provides a blank time in each revolution of the disc 7 during which switching operations may be performed.

Signals may be magnetically recorded on any part of surface of the disc 7 lying within the boundaries of the track *a* to *n*, except for certain areas of the track *c* and *d*, which areas are indicated by cross hatching in FIG. 3. The purpose of these blank areas will become apparent when the arithmetic operations of the calculator are considered in more detail hereinafter. The magnetic surface of the disc may consist of a plating or coating of suitable magnetic material the disc itself being of nonmagnetic material. Suitable magnetic materials are well known in the field of magnetic sound recording. The magnetic material is not applied to the surface of the disc in the areas indicated by cross hatching. Alternatively the disc may itself consist of a suitable magnetic material and the cross-hatched areas are then recessed sufficiently far below the general level of the surface of the disc to prevent effective recording taking place in such areas.

Each sector of each track is divided up into 40 signal storage areas $0^1$ to $39^1$ as is shown for sector I in FIG. 3. In general, the storage areas $0^1$ to $9^1$ of each sector are used for the storage of digital values, and the areas $10^1$ to $39^1$ are used in the arithmetic processing and transfer of values from one track to another. A particular digit value is represented by recording a signal which has an abrupt change within the storage area corresponding to the value of the digit. For example, in track *a* such a change occurs in the storage area $8^1$ as indicated by the mark 17*a*, so that the recording in sector I of track *a* represents the digit value 8. In a similar way, the marks 17*b* and 17*c* indicate that the digit values 2 and 0 are recorded in sectors II and III of track *a* respectively. Thus, assuming that signals representing zero are recorded in the remaining sectors of track *a* the numerical value record in the track is 000 000 000 028.

The desired digit representing change may be obtained in any one of the several ways. The surface of the disc may normally be magnetically neutral, and the signals such as 17*a* are represented by strongly magnetized areas. Such a signal is produced by applying a current pulse to a recording head at a time when the particular storage area is passing beneath the gap of the head. Alternatively, the surface may normally be strongly magnetized in one direction and the current pulse made of sufficient amplitude to reverse the direction of magnetization in the required storage area.

As shown, in FIG. 3, the track *b* of the disc is divided into 10-subtracks *bo* to B9. Two separate head assemblies $32^0$ to $32^9$ and $33^0$ to $33^9$ (FIG. 4) are associated with the 10 subtracks of the track *b*. The suffix number of each head indicates the number of the subtrack with which it is associated. The gaps of the heads 32 are staggered circumferentially as well as radially, the circumferential spacing between the gaps of adjacent heads being equal to the spacing between adjacent storage areas in each track. Thus, when the gap of the head $32^0$ is opposite the storage area $0^1$ of a sector in the track *bo*, then the gap of the head $32^9$ is opposite the storage area $9^1$ of the track *b*9, and similarly for the intermediate heads. On the other hand the heads 33 are staggered in a radial direction only, so that when the gap in the head $33^0$ is opposite the storage area $0^1$ of of the track *b*0, the gap of the head $33^9$ is opposite the storage area $0^1$ of the track *b*9.

A pair of heads $34^1$ and $35^1$ is associated with the track *c*. The gap in the head $34^1$ is spaced in a circumferential direction from the gap in the head $35^1$ by a distance equal to the separation between adjacent storage areas. A similar pair of heads $34^2$ and $35^2$ is associated with the track *d*. The heads $33^0$ to $33^9$, $34^1$ and $34^2$ lie on the same radial line. A head 31 cooperates with the track *a* and lies on the same radial line as the head $32^0$.

The construction of the head 31 is similar to that of magnetic heads used for sound recording on magnetic tape, and it consists of a substantially rectangular lamination of magnetic material with a gap in one side. A coil is wound on the opposite side of the lamination and acts as an energizing coil when the head is used for recording and as a pickup coil when the head is used for reading. Preferably, the head is mounted so that the gap is in close proximity to the magnetic surface of the disc 7 but that the head is not in actual contact with the disc. This allows effective reading and recording while preventing wear of the disc or the head.

The individual heads 32, 33, etc., may be similar in construction to the head 31. However, where a number of heads are used in close proximity the spacing of the storage areas and tracks may be limited by the physical size of the individual heads. In such cases it may be more convenient to use an arrangement in which a number of heads are mounted as a unitary assembly.

Figure 4:
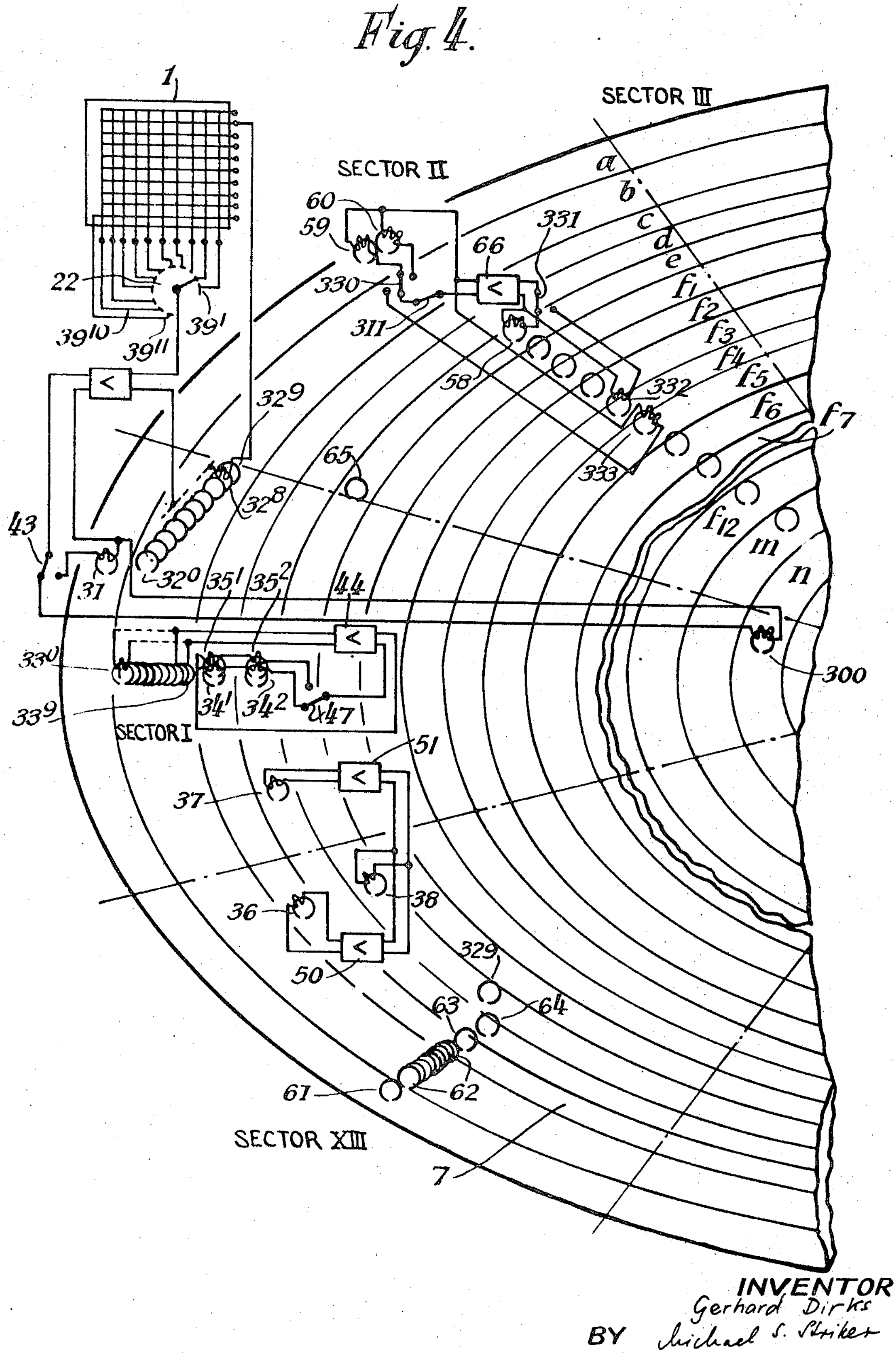
FIG. 4 is a schematic illustration of part of the magnetic storage disc, the associated magnetic transducing heads and amplifying and control circuits.
Figure 5:
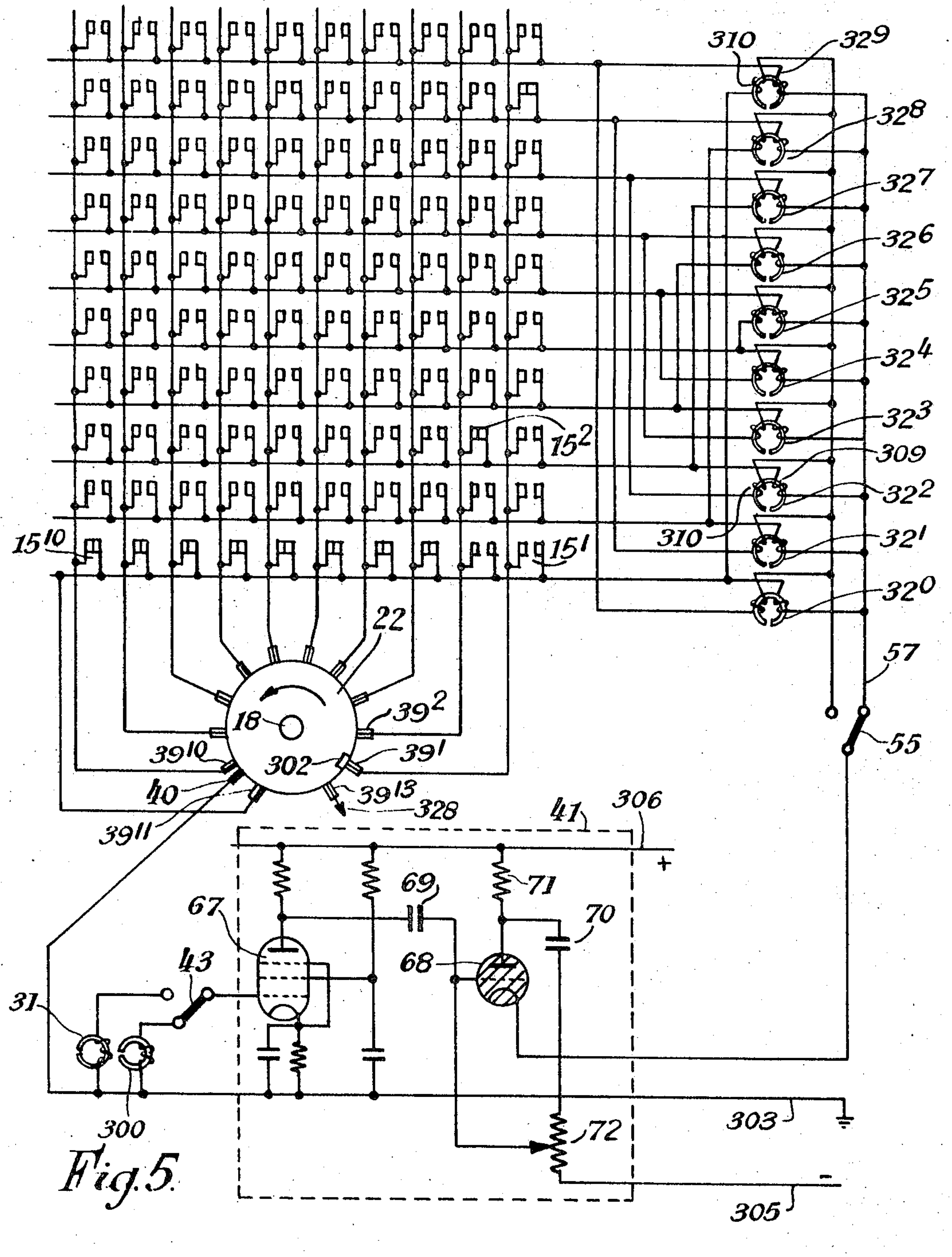
FIG. 5 is a circuit diagram showing keyboard controlled contacts for data entry and the associated signal recording circuit.

A value set up on the keyboard 1 by a depression of the appropriate keys 8 is recorded in the track *b* of the disc 7 by the heads 32. The different denominational values represented by the different columns of keys must be recorded in the corresponding sectors of the disc 7 and this function is performed by the distributing commutator or switch formed by the rotor 22 and the brushes 39 and 40. The brush $39^1$ (FIGS. 2, 4 and 5) is connected to one contact of each of the pairs of contacts $15^1$ which are operated by the keys 8 in the first column of the keyboard. Similarly, the brush $39^2$ is connected to one contact of the pairs of contacts $15^2$ and so on for the other brushes 39. The other contact of each pair is connected to a winding 309 on that one of the heads 32 which corresponds to the digital value represented by the contact and also to a winding 310 on that head which corresponds to the complement of the value. As will be explained, with a switch 55 in the position shown, the winding 309 are effective. Thus the row of contacts $15^1$ to $15^10$ which are operated by the 0 value keys are connected to the winding 309 on the head $32^0$, the contacts associated with the 1 value keys are connected to the winding 309 on the head $32^1$ and so on. The common brush 40 of the commutator is connected to a ground line 303, (FIG. 5). With the rotor 22 in the position shown in FIG. 6, there is then a circuit from the ground line 303, the common brush 40, the metallic segment 302, the brush $39^1$ and the 8 value contact $15^1$ to the head $32^8$, it being assumed that the 8 value key 8 is depressed in the lowest denomination of the keyboard. The relative positions of the rotor 22 and the disc 7 on the shaft 18 are such that the sector I part of track *b* is passing the recording heads 32 during the time that the circuit is completed through the brush $39^1$. As the rotor 22 moves anticlockwise, the segment 302 will break contact with the brush $39^1$ and make contact with the brush $39^2$, so that a circuit is completed to the head $32^2$ as determined by the closed state of the 2 value contacts $15^2$.

Thus the heads 32 are placed under control of the different columns of keys in turn, as the corresponding sectors of the disc 7 pass beneath the heads 32.

The exact time at which signals are recorded in the track *b* is determined by signals sensed from the tracks *a* or *n* of the disc 7. It will be seen from FIG. 3 that signals 304 are recorded in the storage position $0^1$ of each of the sectors I to XII of the track *n*. These signals are sensed by a magnetic head 300 (FIGS. 4 and 5) which may be connected to the input of an amplifier 41 by setting a switch 43. The head 300 lies on the same radial line as the heads 31 and $32^0$.

The amplifier 41 comprises a pentode 67 and a gas triode 68 (FIG. 5). Signals induced in the winding on the head 300 by the passage of recorded signals 304 past the head gap are fed to the control grid of the pentode 67 via the switch 43, (in the position shown). The pentode 67 is connected as a conventional resistance-capacity coupled amplifier. The winding of the head 300 is so connected that the passage of a signal 304 past the gap of the head causes a negative voltage impulse to be applied to the control grid of the pentode 67. The resulting amplified positive pulse which appears at the anode of the pentode is fed to the grid of the gas triode 68 via a capacitor 69. The grid of the triode 68 receives a negative bias from a potentiometer 72 which is connected between the ground line 303 and a negative supply line 305. This bias normally holds the triode in a nonconducting condition. The anode of the triode is connected through a resistor 71 to a positive supply line 306 and a capacitor 70 is connected between the anode and the ground line 303. The amplitude of the positive pulse fed to the grid of the triode 68 when the head 300 senses one of the signals 304 is sufficient to overcome the bias and ionize the triode.

The cathode of the triode 68 is connected in common, via the switch 55 in the position shown, to one side of the windings 309 of all the heads $32^0$ to $32^9$. Thus, when the triode 68 is ionized cathode current flows through one of the heads 32, selected by a closed contact of the keyboard and the commutator to the ground line 303. The values of the resistor 71 and the capacitor 70 are such that the conduction current of the triode rapidly reduces the anode voltage to a value which is insufficient to maintain ionization, so that the triode deionizes and a relatively short pulse of current flows in the cathode circuit. The capacitor 70 then recharges to the full supply voltage through the resistor 71 before the time at which the next signal 304 is sensed by the head 300.

The signal 304 in sector I of the track *n* will be sensed while the commutator rotor 22 is in the position shown in FIG. 5.

Hence the cathode current of the triode 68 flows through the winding 309 of the head $32^8$, the 8 value contact $15^1$ which is closed, the brush $39^1$, the segment 302 and the common brush 40 to the ground line 303. The pulse of cathode current in the winding 309 of the head $32^8$ energizes the head to produce a discrete area of magnetization on the surface of the disc 7 in track *b*. Since the heads 300 and $32^0$ lie on the same radial line, the signal 304 which is in the storage position $0^1$ will be sensed at the same time as the gap in the head $32^0$ is positioned over the storage area $0^1$ in the subtrack *bo*. It has already been explained that the heads 32 are staggered circumferentially from each other by a distance equal to one storage area, so that it will be apparent that the head $32^8$ is positioned at this time over the storage area $8^1$ in the subtrack *b*8. Consequently, the pulse of cathode current flowing through this head will record a signal in the storage position $8^1$ of the subtrack *b*8. Thus the signal 307 is recorded to represent the digit value 8 in accordance with the keyboard setting in the lowest denomination.

As the disc 7 continues to rotate the signal 304 in sector II will pass beneath the head 300, so that the gas triode 68 will receive another impulse on its control grid. The commutator rotor 22 will have moved a corresponding distance and the cathode circuit of the triode 68 will be completed through the winding 309 of the head $32^2$, the 2 value contact $15^2$, the brush $39^2$, segment 302 and the common brush 40 to the ground line 303. The pulse of cathode current will cause the head $32^2$ to record a signal 308 in the storage position $2^1$ of the subtrack $b^2$ to represent the digital value 2 set up on the second column of the keyboard. As the disc 7 continues to rotate signals will be recorded in the storage position $0^1$ of the subtrack *b0* in the sectors III to X in a similar way. Thus, the value set up on the keyboard is recorded in the form of signals in the track *b*, one digit value being recorded in each sector.

The keyboard 1 has 10 denominational columns of keys 8, whereas the disc 7 has 12 sectors in which numerical values may be recorded. Sector XII is used for recording the "fugitive one" carry which may occur during subtraction. Zero or the complement thereof is entered in sector XI from the keyboard by the direct connection of the commutator brush $39^1$1 to one end of the winding 309 on the head $32^0$ and to one end of the winding 310 on the head $32^9$.

By setting the switch 43 to the other position the sum of the value set up on the keyboard and the value recorded in the track *a* may be recorded in track *b*. The switch 43 may be set to one or other position under the control of one of the function keys 4 of the keyboard 1. It will be assumed, by way of example, that the value 28 is set up on the keyboard and that the value 28 is also recorded in track *a*. The recording takes place in track *b* in a manner similar to that described above, except that the time at which the triode 68 is ionized is now determined, not by the signals 304, but by the signals 17*a*, 17*b*, etc., since the control grid of the pentode 67 is now connected to the head 31 via the switch 43. Starting with sector I, passing the heads 31 and 32, there is no signal recorded in the $0^1$ storage position of track *a*, corresponding to the signal 304 in track *n*, so that the head $32^8$ is not energized at this time. No recording takes place until the disc has moved to bring the signal 17*a* in track *a* past the gap in the head 31. The head 31 then applies a pulse to the pentode 67, which in turn applies a pulse to the control grid of the triode 68 to ionize it. Since the heads 31 and $32^0$ lie on the same radial line, the head $32^0$ is over the storage position $8^1$ of the subtrack *b0* at this time and the head $32^8$ is over the storage position $16^1$ of the subtrack *b*8. Accordingly the head $32^8$ will record a signal in the storage position $16^1$ of the subtrack *b*8 to represent the value 16, which is the sum of the 8 recorded in the first sector of track *a* and the 8 set up on the first column of the keyboard, without subtraction of the decimal carry.

In a similar manner the signal 17*b* in track *a* will be sensed by the head 31 when the head $32^0$ is opposite storage position $2^1$ in sector II of subtrack *d0*. Since sector II is being recorded in, the head $32^2$ is connected in the cathode circuit of the triode 68 by the keyboard and the commutator, and this head will be over the storage position $4^1$ in sector II of the subtrack *b*2.

Accordingly the sensing of the signal 17*b* by the head 31 will cause recording of a signal in the storage position $4^1$ of sector II of the subtrack *b*2 by the head $32^2$. It will be apparent that signals will be recorded in the storage position $0^1$ of the subtrack *b0* in the sectors III to XII.

In this way signals representing the value 16 and 4 are recorded in the sectors I and II respectively, representing the sum of 28 and 28 without propagation of the decimal carry. The conversion of the sum recorded in track *b* to the correct decimal representation will now be described. The signals in the track *b* are sensed and recorded selectively in either the track *c* or track *d* depending upon whether the digit value is less than 10 or more than 10. The recording of these signals is controlled by a carry switch 47 so that account of the appropriate carries is taken in the recording. Finally the signals are sensed from the tracks *c* and *d* and are recorded in track *e* in decimal form.

The signals recorded in the subtracks *b0* to *b9* of track *b* are sensed by heads $33^0$ to $33^9$ (FIG. 4) which are connected in parallel to the input of an amplifier 44. The heads $33^0$ to $33^9$ lie on the same radial line and the head $33^0$ is spaced by 10 storage positions from the head $32^0$. This is shown more clearly in FIG. 8 which schematically illustrates the relative positions of the various sensing, recording and erasing heads, which are shown in FIG. 4. Each sensing head is represented by a circle, each recording head is represented by a cross and each erasing head is represented by an asterisk.

Figures 6, 7:
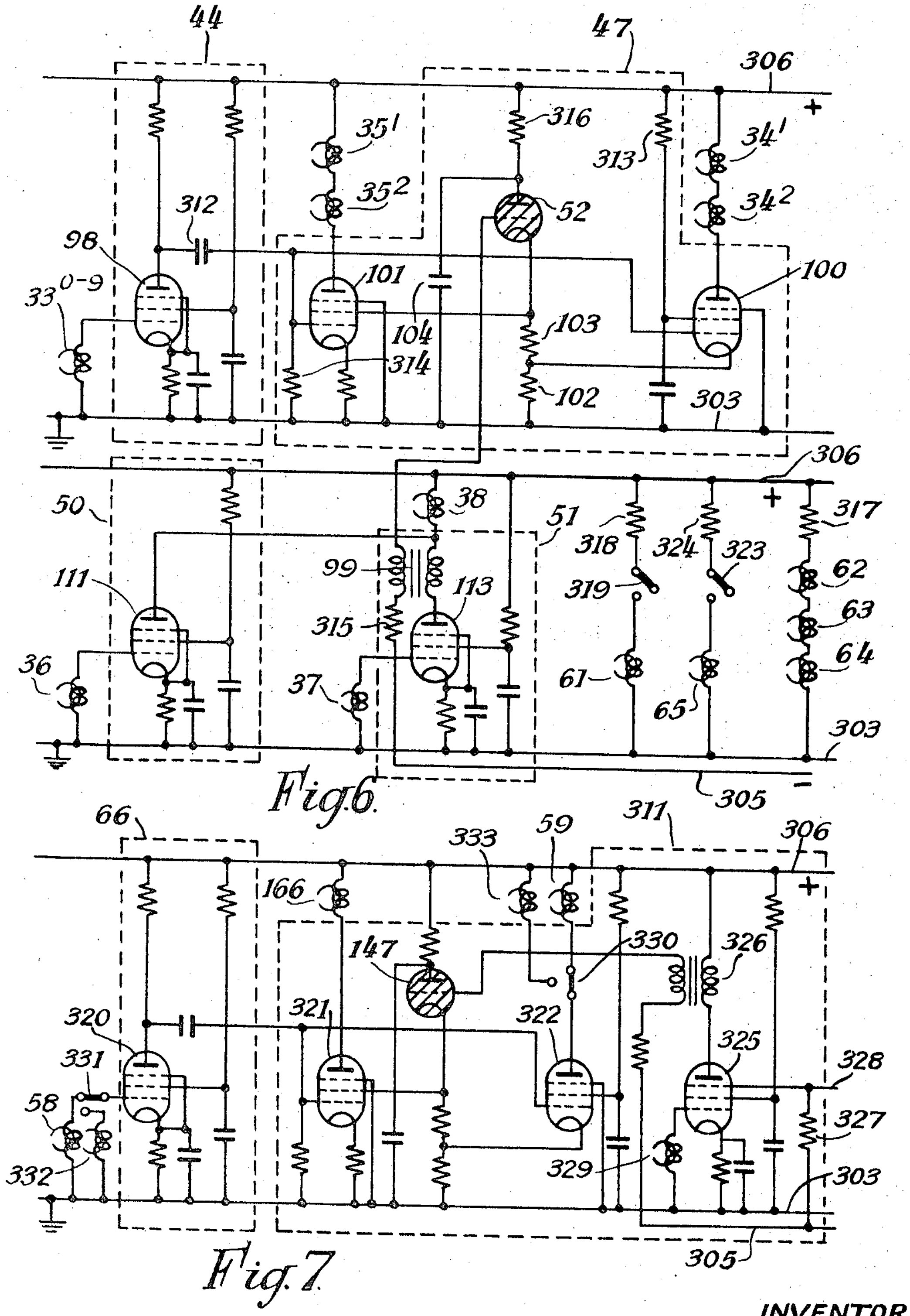
FIG. 6 is a circuit diagram of the arithmetic unit.
FIG. 7 is a circuit diagram of a signal transfer and correction circuit.

The amplifier 44 is formed by a pentode 98 (FIG. 6) which is connected as a conventional resistance-capacity couped amplifier. The windings of the heads $33^0$ to $33^9$ are all connected in series to the control grid of the pentode 98 and the windings are so poled that each time a signal is sensed by any one of the heads 33 a positive pulse appears at the anode of the pentode 98. Such a pulse is applied via a capacitor 312 to the control grids of two pentodes 100 and 101. These two pentodes together with a gas triode 52 form the carry switch 47, (FIGS. 4 and 6). The triode 52 has two cathode load resistors 103 and 102 in series. The screen grid of the pentode 101 is connected directly to the cathode of the triode 52. The cathode of the pentode 100 is connected to the junction of the two resistors 102 and 103. Hence, when the triode 52 is nonconducting the screen of the pentode 101 is only slightly positive and no appreciable anode current flows. The screen of the pentode 100 is connected through a resistor 313 to the HT line 306. The control grids of both pentodes are connected through a resistor 314 to the ground line 303, and the suppressor grids are connected directly to the line 303. The value of the resistor 102 is such that the pentode 100 passes relatively little anode current. The recording heads $35^1$ and $35^2$ are connected in the anode circuit of the pentode 101 and the heads $34^1$ and $34^2$ are connected in the anode circuit of the pentode 100.

When the control grids of the pentodes 100 and 101 receive a positive pulse due to the sensing of a signal by any one of the heads $33^0$ and $33^9$, the pentode 100 is driven heavily in to conduction, so that a large anode current flows through the heads $34^1$ and $34^2$. Since the screen voltage of the pentode 101 is so low the positive pulse has substantially no effect on the anode current of this valve. The anode current of the pentode 100 flowing through the windings of the heads $34^1$ and $34^2$ produces a substantial flux across the gaps of these heads.

In the example considered above of the addition of 28 and 28 a signal was recorded in the storage position $16^1$ of sector I of subtrack *b*8. As the disc continues to rotate in an anticlockwise direction after this signal has been recorded, the signal will pass beneath the head $33^8$ and will induce a signal in the head winding. This signal is amplified by the pentode 98 and applied to the two pentodes 100 and 101. As already explained this will energize the heads $34^1$ and $34^2$. The heads $34^1$ and $34^2$ lie on the same radial line as the heads $33^0$ to $33^9$ (FIG. 8), so that at the time when they are energized the storage positions $16^1$ of sector I of the tracks *c* and *d* respectively will be beneath the two heads. That part of the track *c* which corresponds to the storage positions $10^1$ to $19^1$ in each of the sectors I to XII cannot be magnetized since there is no magnetic layer in these areas. Accordingly, although both the heads $34^1$ and $34^2$ are energized simultaneously, a signal will be recorded only in the storage position $16^1$ of sector 1 of track *d*. Since the storage positions $0^1$ to $9^1$ in the sectors I to XII of track *d*have no magnetizable layer it will be apparent that if the signal sensed by the heads $38^0$ to $33^9$ is in one of the storage positions $0^1$ to $9^1$ then a signal will be recorded in the corresponding storage position in the track *c*, and that if the sensed signal is in one of the storage positions $10^1$ to $19^1$ then a signal will be recorded in the corresponding storage position in track *d*. In other words, a signal is recorded in track *c* if the value in track *b* is less than 10, and a signal is recorded in track *d* if the value is greater than nine.

The heads $35^1$ and $35^2$ are spaced from the heads $34^1$ to $34^2$ by a distance equal to one storage position. Consequently, if a pulse from the pentode 98 renders the pentode 101 conducting, instead of the pentode 100, the value which is recorded in the track *c* or *d* as the case may be, is greater by one than the value in track *b* which produced the recording. Hence, the pentode 101 is made effective when a carry from a previous denomination has to be taken into account.

If the gas tube 52 is rendered conducting a relatively large voltage drop is produced across the cathode load resistors 102 and 103 so that the screen voltage of the pentode 101 is raised sufficiently to allow it to pass a substantial anode current when a positive pulse is applied to the control grid by the pentode 98. At the same time, the increased voltage drop across the resistor 102 raises the cathode potential of the pentode 100 to such an extent that the pulse applied to the control grid produces no change in the anode current. The gas tube 52 may be ionized by a signal applied to the control grid from an amplifier 51.

Figure 8:
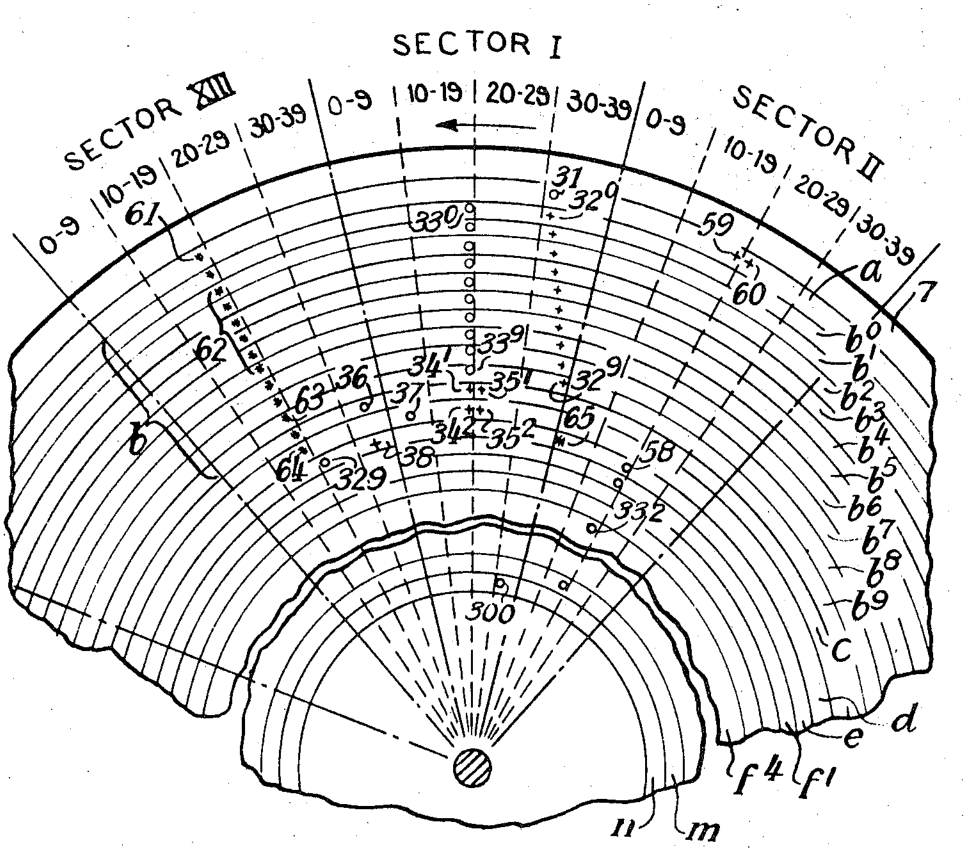
FIG. 8 is a schematic illustration of part of the magnetic storage disc to show the relative positioning of the magnetic transducing heads.

The amplifier 51 comprises a pentode 113 which receives signals on its control grid from a magnetic head 37 (FIGS. 6 and 8). The primary winding of a transformer 99 and the winding of a head 38 are connected in series in the anode circuit of the pentode 113. One end of the secondary winding of the transformer 99 is connected to the control grid of the tube 52 and the other end of the winding is connected through a resistor 315 to the negative supply line 3—5. The bias supplied to the grid of the tube 52 from the line 305 is sufficient to hold it normally nonconducting, however, this bias may be overcome by a signal induced in the secondary of the transformer 99 due to the flow of anode current in the pentode 113. The head 37 is positioned in track *d*and is spaced by a distance equal to 15 storage positions from the head $34^2$. Hence, as the disc 7 continues to rotate, the signal which was recorded in the storage position $16^1$ of sector I of track *d* by the head $34^2$ will be sensed by the head 37 which will applying a signal to the grid of the pentode 113. The resulting increase in anode current induces a voltage in the secondary of the transformer 99, which increase is applied to the grid of the tube 52 to ionize it. Thus the pentode 101 is made operative and will remain so until after the signal recorded in sector II of track *b* has been sensed by the heads $33^0$ to $33^9$. The tube 52 will be extinguished after this by the action of resistor 316 and capacitor 104, in a manner similar to the extinguishing of the tube 68 (FIG. 5).

The anode current of the pentode 113 also energizes the head 38 to record a signal in track *e*. The head 38 is spaced from the head 37 by a distance equal to 10 storage positions (FIG. 8) so that the sensing of the signal in storage position $16^1$ of sector I of track *d* causes the head 38 to record a signal in storage position $6^1$ of sector I of track *e*. Thus the digit value 6 is finally recorded in sector I of track *e*.

The continued rotation of the disc 7 causes the signal recorded in the storage position $4^1$ of sector II of subtrack *b*4 to be sensed by the head $33^4$. The tube 52 is still conductive at this time, so that the pulse produced by the pentode 98 in response to the sensing of this signal produces a pulse of anode current in the pentode 101, so energizing the heads $35^1$ and $35^2$. The storage positions $0^1$ to $9^1$ of the track *d* cannot be magnetized, so that only the head $35^1$ is effective to record a signal. Since the head $35^1$ is offset by one storage position (FIG. 8) from the head $34^7$ a signal will be recorded by the head $35^1$ in storage position $5^1$ of sector II of track *c*. Since, no signal is recorded in sector II of track *d* the head 37 will not be effective to cause energization of the head 38 in the manner described in relation to sector I. However, the signal in sector II of track *c* is sensed by a head 36 which lies on the same radial line as the head 38. The winding of the head 36 is connected to an amplifier 50 formed by a pentode 111, the anode of which is connected to the junction between the primary winding of the transformer 99 and the winding of the head 38. Consequently, the head 38 is energized in response to the sensing of a signal by the head 36, but no voltage is developed in the secondary winding of the transformer 99. Since the heads 36 and 38 lie on the same radial line the sensing of the signal in the storage position $5^1$ of sector II of track *c* will cause the head 38 to record a signal in storage position $5^1$ of sector II of track *e*. It will be apparent from the foregoing detailed description of the recording of the sum digits in sectors I and II of track *e*that the zeros recorded in sectors III to XII of track *b* will cause recording of zeros in the corresponding sectors of track *e*. Thus, the signals in the track *e* represent the sum of the number set up on the keyboard 1 and the number recorded in the track *a*.

It will be appreciated that signal recordings are transferred from track *b* to track *e* in the manner described above, whether the recording in track *b* is controlled jointly by the keyboard and track *a* or by the keyboard and track *n*.

The track *b* has been described as divided into 10 subtracks. This is practically convenient since it allows a relatively large area for the mounting of the staggered heads 32. However, the operation of the device requires only that the heads 32 are spaced apart by one storage position in the circumferential direction. Hence, the heads 32 may lie on the same circumferential line provided that the heads are of such physical size that the required spacing of the gaps may be maintained.

An erasing head 62 (FIGS. 4, 6 and 8) is associated with each of the subtracks *d*0 to *b*9. These heads are positioned a distance equal to one sector away from the heads $33^0$ to $33^9$. Similar erasing heads 63 and 64 are associated with the tracks *c* and *d* respectively, and lie on the same radial line as the heads 62. The heads 62, 63 and 64 are connected in series with each other and with a resistor 317 between the supply line 306 and the ground line 303. Consequently, a continuous current passes through these heads and they produce a magnetic field, in the opposite sense to that produced by the recording heads 32, 34 and 35, which is sufficiently intense to erase any signals recorded by the heads 32, 34 and 35. Hence after the signals have been recorded in the track *e*, the signals in the track *b*, *c* and *d* are erased by the erasing heads.

An erasing head 61 is associated with the track *a*, the head 61 is connected in series with a switch 319 and a resistor 318 between the supply line 306 and the ground line 303. Thus, if the switch 319 is closed a continuous current passes through the head 61 and the head produces a flux which erases the signals recorded in the track *a*. The switch 319 may, for example, be operated by the function keys of the keyboard.

If the signals recorded in the track *a* are erased by the head 61 after they have been added to the values represented by the keyboard the sum value may be transferred from the track *e* to the track *a*. This is effected by a sensing head 58 in the track *e* and a recording head 59 associated with the track *a*. The head 58 is positioned a distance equal to 20 storage positions from the head $32^9$ (FIG. 8). Signals from the head 58 are fed to a resistance-capacity coupled amplifier 66 (FIGS. 4 and 7), which incorporates a pentode 320. The signals from the amplifier 66 are fed to the control grids of two pentodes, 321 and 322. The pentodes 321 and 322 form part of a signal gating arrangement 311 which operates in a manner generally similar to the gating arrangement formed by 47 of FIG. 6. The pentode 322 is normally allowed to respond to signals from the amplifier 66 by a gas tube 147 which prevents the pentode 321 responding to such signals. The gas-valve 147 is effective to render the pentode 321 operative, and the pentode 322 inoperative, only in certain cases of subtraction, as will be explained in more detail hereinafter. Consequently for the transfer of sum values from the track *e* to the track *a* the pentode 322 may be regarded as operating as an amplifier. Consequently, each time the head 58 senses a signal in the track *e* the head 59 will be energized by the pentode 322 to record a signal in track *a*. Since the heads 58 and 59 lie on the same radial line, the head 59 will record a signal in the storage position in track *a* which corresponds to that which contained the signal in track *e*. Hence after all the sectors have passed beneath the head 58, the value stored in track *e* will have been recorded in track *a*. An erasing head 65 is associated with the track *e* and may be made operative to erase the signals recorded in that track by closing a switch 323 (FIG. 6), which connects the head 65, in series with a resistor 324, between the supply line 306 and the ground line 303.

Subtraction is effected by complementary addition. In order to subtract a value set up on the keyboard 1 from a value recorded in the track *a* the switch 55 (FIG. 5) is set to the alternative position, so that the cathode of the tube 68 is connected to one end of all the windings 310 on the heads 32, instead of to the windings 309. The windings 310 are connected to the keyboard in a complementary fashion relative to the windings 309, so that for example the winding 310 of the head $32^0$ is connected to the 9 value keys, the winding 310 of the head $32^1$ is connected to the 8 value keys, and so on. Hence, it will be apparent, with 28 entered on the keyboard as is shown in FIG. 5, that the head $32^1$ will be energized under control of the 8 value key and that the head $32^7$ will be energized under control of the 2 value key during recording in sectors I and II respectively, of track *b*. Apart from this selection of the recording heads, the operation is similar to that already described in detail for the addition of two values, so that it will be appreciated that the signals recorded in track *b* will represent the sum of the value in track *a* and the complement of the value set up on the keyboard, that is to say, it will be equal to the difference between these two values.

With the arrangement each digit of the value set up on the keyboard is entered as a complement to 9, so that if the value in track *a* is larger than that set up on the keyboard, a fugitive 1 carry is necessary, that is to say, a carry from the highest denomination to the lowest. When the difference value is recorded in track *e*, if such a carry occurs it will be recorded in storage position $1^1$ of sector XII of track *e* by the normal operation of the arithmetic circuits. The presence of such a signal is utilized to fire the gas tube 147 to render the pentode 321 effective. Thus, when the signal recorded in sector I of track *e* is sensed by the head 58 the pentode 321 will be effective to amplify the signal and energize the head 60. Since the head 60 is displaced by one storage position from the head 59, the signal recorded in track *a* will be greater by 1 than that sensed in track *e*.

The signals in track *e* are sensed by a head 329 (FIGS. 4 and 8) which is spaced from the head 58 by a distance equal to two sectors less one storage position. Hence, the head 329 commences to sense sector XII of track *e* just before the head 58 starts to sense sector I of track *e*. The winding of the head 329 is connected to the control grid of a pentode amplifier 325. The primary of a transformer 326 is connected in the anode circuit of the pentode 325 and the secondary of this transformer is connected to the grid of the gas tube 147. The suppressor grid of the pentode 325 is connected through a resistor 327 to the negative supply line 305. This biases the suppressor grid sufficiently to prevent the flow of anode current in response to signals from the head 329. However, the suppressor grid is also connected to the brush $39^{13}$ (FIG. 5), via a line 328. This brush will be connected by the segment 302 to the common brush 40. Thus connecting the suppressor grid of the pentode 325 to the earth line 303 at a time when the sector XII of track *e* is being sensed by the head 329. Thus, the pentode 325 produces an output in the anode circuit only upon the occurrence of a signal in sector XII of track *e*, and such a signal produces an output in the secondary of the transformer 326 to ionize the gas tube 147.

The circuit comprising the pentodes 321, 322 and 325 and the gas tube 147 which effects the recording of signals in the track *a* with or without a carry thus operates in the same manner as the circuit comprising the pentodes 100, 101 and 113 and the gas tube 52 which controls the recording of signals with or without carry in the tracks *c* and *d* except that in the case of the former circuit a carry can only be added during the recording of signals in sector I of track *a*.

The control grid of the pentode 320 (FIG. 7) may be connected to a magnetic head 332 (FIGS. 4, 7 and 8), which is associated with the track *f*4, by changing the position of a switch 331. Hence, sensing of signals in track *f*4 will then control recording of signals in track *a*. The heads 59 and 332 lie on the same radial line, so that a value will be transferred unchanged from track *f*4 to track *a*, The anode of the pentode 322 may be connected to the winding of a head 333, which is associated with the track *f*5, by changing the position of a switch 330. Hence each time the pentode 322 is operated by the sensing of a signal in track *e*, or track $f4$, a signal will be recorded in track $f5$. Similar switched amplifiers (not shown) are provided for the tracks $f1$, $f2$ etc., so that values may be transferred between the tracks as desired.

The disc 7 and the associated transducing heads provide a serial storage device in which successive denominational values may be read and recorded successively. Such a facility may be provided equally well by a drum having circumferential magnetic tracks. A magnetic drum store is disclosed in my copending application Ser. No. 498,047, now abandoned.

I claim:

1. Calculating apparatus for processing numbers having a plurality of denominations and a plurality of digits within each denomination, comprising, in combination, dynamic storage means having a plurality of groups of dynamic storage positions each group corresponding to one of said denominations, dynamic storage positions in each group corresponding to each of said digits, storage of a number in said dynamic storage means resulting in a change in a determined characteristic of the corresponding dynamic storage position, all of said dynamic storage positions moving in synchronism past at least one determined location, said dynamic storage means having input storage positions and output storage positions; means for reading operatively associated with said input storage positions; a plurality of means for writing, operatively associated with said output storage positions, each spaced relative to said determined location in accordance with an intended arithmetic operation; static storage means having a plurality of denomination selection lines, a plurality of digit selection lines, and means for selecting a digit in each denomination, said static storage means further comprising interconnecting means for interconnecting the digit and denomination selection lines corresponding to a selected digit; further interconnecting means interconnecting each of said digit selection lines to a corresponding one of said means for writing, whereby a series circuit is formed upon storing of a digit; and distributing means for applying signals from said means for reading in a predetermined sequence to said denomination lines in synchronism with the movement of said dynamic storage positions past said determined location, whereby a signal stored in the output storage positions of said dynamic storage means is dependent upon the numbers stored in both said dynamic and said static storage means and said intended arithmetic operation, thus constituting an arithmetic output signal.

2. A computing arrangement as set forth in claim 1, wherein said static storage means comprise a keyboard; and wherein said means for selecting a digit in each of said static storage groups comprise keys of said keyboard.

3. A computing arrangement as set forth in claim 1, further comprising means for erasing said number in said input storage position; and means for writing said arithmetic output signal into said input storage positions.

4. A computing arrangement as set forth in claim 1, wherein said dynamic storage means comprise a disc having a magnetizable surface.